2 Sheets--Sheet 1.

T. T. WOOD.
Machine for Making Wrought Nail-Blanks.

No. 163,619. Patented May 25, 1875.

WITNESSES
E. P. Duhamel
S. M. Davies

INVENTOR
Thomas T. Wood
By Gridley & Warner
attys

THE GRAPHIC CO.PHOTO-LITH.39 & 41 PARK PLACE,N.Y.

2 Sheets--Sheet 2.
T. T. WOOD.
Machine for Making Wrought Nail-Blanks.
No. 163,619. Patented May 25, 1875.
*Fig. 3*
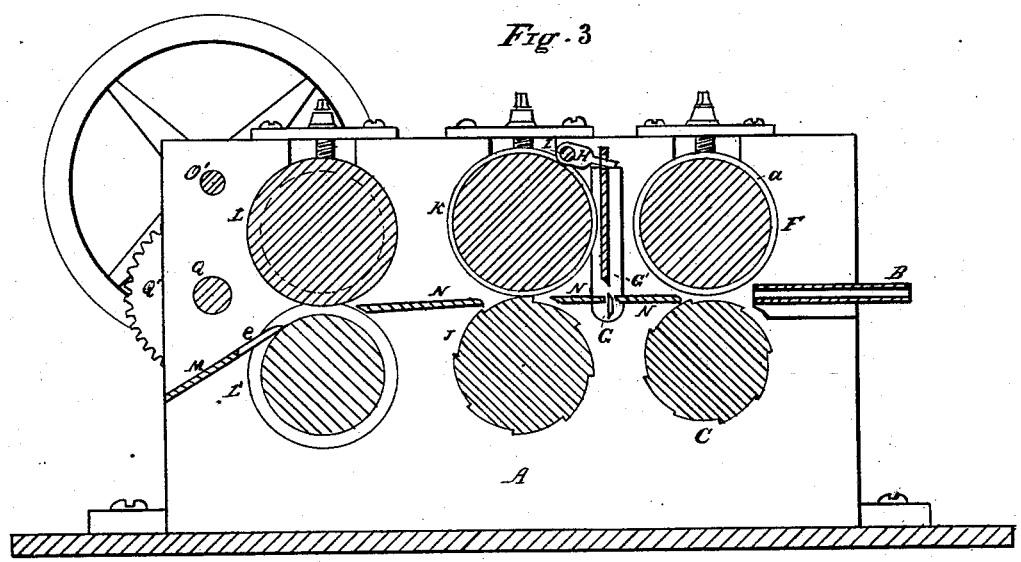
*Fig. 4*
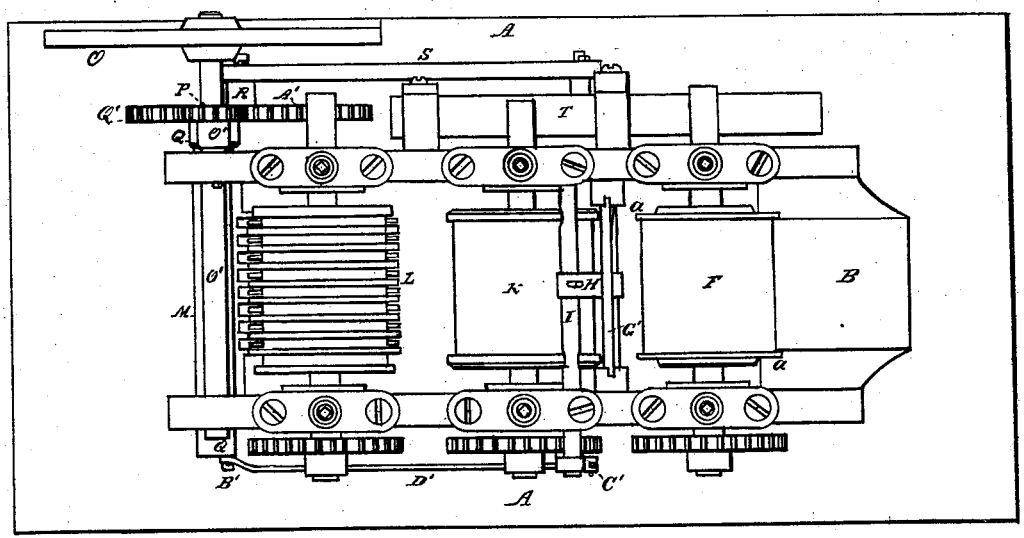
*Fig. 5*
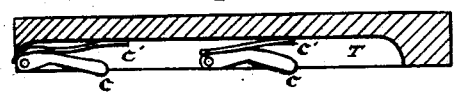
*Fig. 6*
*Fig. 7*
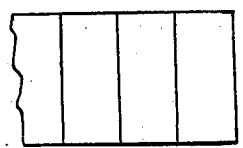
WITNESSES
E. P. Duhamel
M. Davies
INVENTOR.
Thomas T. Wood
By Gridley & Warner
Attys
THE GRAPHIC CO.PHOTO-LITH.39 & 41 PARK PLACE, N.Y.

UNITED STATES PATENT OFFICE.

THOMAS T. WOOD, OF CHICAGO, ILLINOIS, ASSIGNOR TO GEORGE B. GRIFFEN, OF SAME PLACE.

IMPROVEMENT IN MACHINES FOR MAKING WROUGHT-NAIL BLANKS.

Specification forming part of Letters Patent No. 163,619, dated May 25, 1875; application filed January 5, 1875.

*To all whom it may concern:*

Be it known that I, THOMAS T. WOOD, of Chicago, in the county of Cook and State of Illinois, have invented a new, useful, and improved Nail-Machine, of which the following is a full, clear, and exact description, which will enable others skilled in the art to which my invention appertains to make and use the said machine, reference being had to the accompanying drawing forming a part hereof, and in which—

Figure 1:
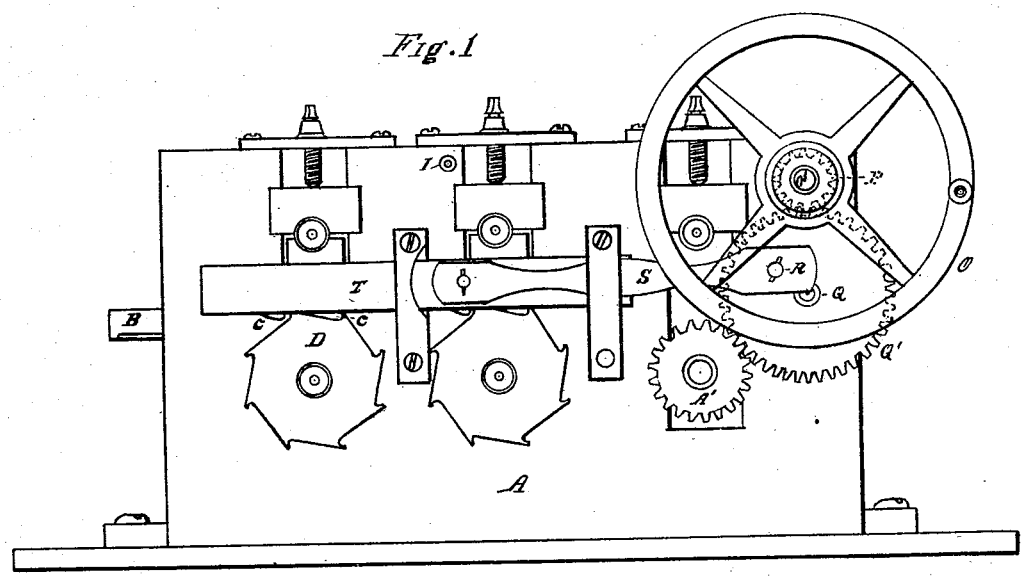
Figure 2:
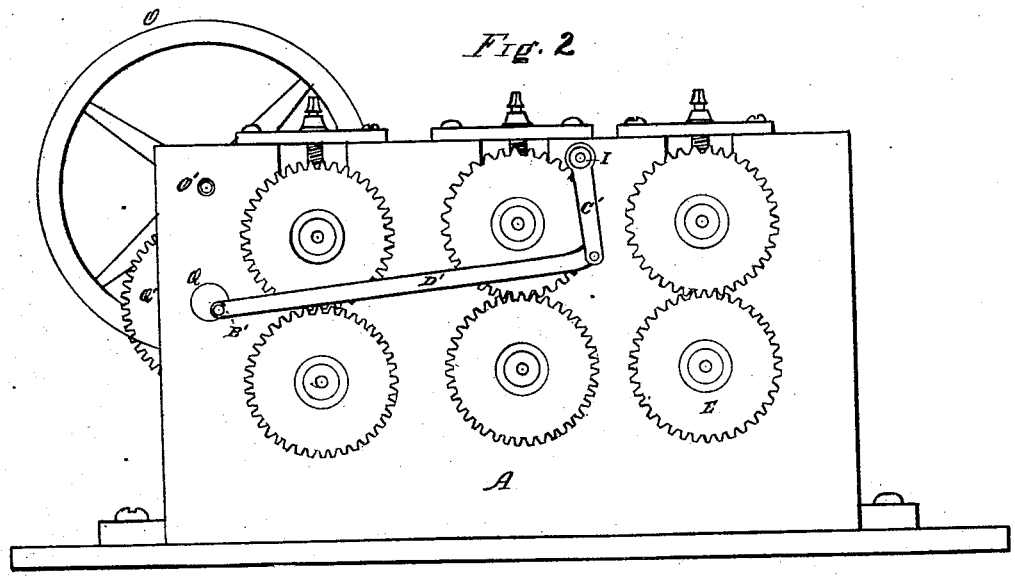

Figure 1, Sheet 1, is a side elevation of my machine; Fig. 2, an elevation of the side opposite that shown in Fig. 1; Fig. 3, a vertical central longitudinal section; Fig. 4, a top or plan view; Fig. 5, a section of the feed-bar; and Figs. 6 and 7, a top and side view, respectively, of the nail-bar after being operated upon by the forming-rollers.

Like letters of reference indicate like parts.

My object is to facilitate the operation of making wrought-iron nails; and to that end my invention consists of a machine adapted to receive long, broad, comparatively thin, and flat bars or sheets, to roll these into broad sections approximating the form of nails, to divide these sections from each other and slit them into separate nails, any desired number of nails being capable of being cut simultaneously, and nothing remaining to be done but to head the nails thus cut, and to finish their points, when very sharp points are desired.

My invention also consists in the means, substantially as hereinafter described, of accomplishing some of the successive steps in attaining this result.

In the drawing, A represents the frame of the machine. B is a guide, adapted to receive the nail-bars and conduct them to the rolls. C is a roller, the periphery of which is serrated, in the manner shown. D is a ratchet-wheel, rigidly mounted on one end of the shaft of the roller C; and E is a spur-wheel, rigidly mounted on the other end thereof. F, in the example shown, is a smooth roller, arranged above the roller C, and provided with small guards *a a*, projecting from its periphery. These guards should be laterally adjustable with relation to each other, and the roller should be vertically adjustable, in order that bars of different width and thickness may be operated upon. G is a fixed blade, and G' is a vertically-movable blade, hung on a rocker-arm, H, on the rock-shaft I. These blades are arranged to operate together, and to sever the sections of the nail-bars from each other at the line of junction of the sections. J and K are rollers, constructed and operating in all respects like the rollers C and F, excepting that the former are not arranged so near each other as the latter are, and have shorter diameters, the object of employing the rollers J and K being to further compress the sections of the nail-bars. L and L' are slitting-rollers, the peripheries of which are grooved or ribbed, as shown, the ribs on one being directly opposite, or slightly entering, the grooves in the other. M is a receiving-table, provided with fingers *c c*, made, preferably, of spring metal, and lying in the grooves of the rollers L', in such a manner as to shift the nails from the slitters to the table M. N N are tables or guides, to conduct the nail bars and sections to the knives and subsequent rollers. O is the driving-wheel, and O' the driving-shaft. P is a pinion on the shaft O'. Q is a shaft, provided with a wheel, Q', engaged by the pinion P. R is an eccentric pin on the wheel Q'. S is a pitman, driven by the pin R, and connected to the feed-bar T. This bar is supported in rests or guides attached to the frame, as shown. *e e* are push-pawls, pivoted to the bar T, and arranged to engage the notches or teeth of the ratchet-wheels on shafts of the rollers C and J. These teeth have curved radial faces, preferably, and the free ends of the pawls are correspondingly curved. I also deem it preferable to employ the springs *c' c'*, for the purpose of insuring the engagement of the pawls with the teeth. A' is a spur-wheel, rigidly attached to the shaft of the slitter L', and engaging the wheel Q'. B' is an eccentric pin on the shaft Q. C' is a crank-arm on the shaft I. D' is an arm or pitman, connecting the pin B' and the arm C'. Each upper roller-shaft is provided with a spur-wheel, engaging a like wheel on the shaft directly below it, as shown in Fig. 2.

In order to make nails on my improved machine, I take the bars from which the nails are to be cut directly from the rolls of a rollingmill, and place them, while they are at a white heat, in the mouth-piece or guide B, the sides of which are, preferably laterally adjustable, in order to admit and firmly hold bars of different width. If it is intended to make nails both sides of which are to be tapered off from the heads toward the points, the rollers F and K should be correspondingly serrated; but when horseshoe-nails, or nails having only one tapering side, are to be made, the serrations may be made, as shown. The bars are inserted, one at a time, into the part B, and are pushed toward the rollers C and F until they are caught by the latter. Thereafter, each bar will be fed automatically through the machine. The form of the bars, after leaving the rollers C and F, is clearly shown in Figs. 6 and 7. The bars are fed to these rollers and to the knives by an intermittent movement, and are at rest when they reach the knives. After one section has passed between the knives, the blade G' descends and severs this section from the remaining part of the bar. This section, however, before being cut away, reaches the rollers J and K, and is seized by them, and these rollers are at rest whenever the forward ones are. The severed section is thus carried between the rollers J and K, and elongated or made more tapering. The guards or flanges a a prevent the bars from being pressed out laterally while being operated upon by the forming-rollers.

When the sections thus cut reach the slitters L and L', the latter slit them into narrow strips or nail-blanks, ready to be headed, and these strips are prevented, by means of the fingers e e, from clinging to the slitters, and are conducted to the table M, from which they pass into any suitable receptacle.

It will be perceived, from the foregoing description, that any number of nails may be thus cut simultaneously, the number being limited only by the width of the bars fed into the machine. It will also be perceived that the nails are cut with the grain of the bars.

The driving-gearing is such as to increase the power applied to the driving-wheel. In the example shown the driving-wheel makes about one revolution while the feed-rollers and formers make twelve.

The operation of elongating the sections may be accomplished by means of rollers smaller than the first set, provided the serrations are properly proportioned.

The radial faces of the teeth of the feed-ratchets, by being curved, enable the push-pawls to find a broad and firm bearing during the rotary movement of the ratchets, and admit of this result being attained when shaping or forming rollers of different sizes are introduced, and which are provided with ratchet-wheels different in size from those shown.

I do not here intend to limit myself to this particular adaptation, a duplication of the serrated rollers, or a modification in the form of the serrations being all that may be required in order to produce wrought-iron nails of various kinds.

I am aware that broad, serrated, or cam-faced forming-rolls have heretofore been employed for the purpose of performing the first step in the operation of reducing broad sheets or bars to the proper form, and that the bars thus operated upon have been cut into narrow strips by means of slitting-rolls, and these strips into pieces corresponding to the length of the nails; but, so far as I am aware, the means by which these separate results have been accomplished have not before been combined, substantially as herein described, in the same machine, and I do not here claim any one of the said devices independently; but

Having thus described my invention, what I claim as new, and desire to secure by Letters Patent, is—

1. The combination, as herein described and shown, of the rollers C and F, the knives G and G', and the rollers J and K, substantially as and for the purposes specified.

2. The combination, as herein described and shown, in a machine for making wrought-iron nails, of one or more pairs of forming-rollers, of the knives G and G', and of the slitting-rollers L and L', substantially as and for the purposes specified.

3. The combination, substantially as described, of forming-rolls, knives, knife-actuating mechanism, slitting-rolls, and an intermittent-feed mechanism, whereby the bars are formed, fed to the knives, there stopped and cut, and then fed forward and slit, all operating together in connection with each other and driving mechanism, in the same machine, for the purposes set forth.

THOMAS T. WOOD.

Witnesses:
CONSIDER H. WILLETT,
F. F. WARNER.